United States Patent
Saiwai

(10) Patent No.: US 9,867,223 B2
(45) Date of Patent: Jan. 9, 2018

(54) NETWORK APPARATUS AND USER TERMINAL

(71) Applicant: KYOCERA CORPORATION, Kyoto (JP)

(72) Inventor: Takahiro Saiwai, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 22 days.

(21) Appl. No.: 14/903,875

(22) PCT Filed: Jul. 8, 2014

(86) PCT No.: PCT/JP2014/068135
§ 371 (c)(1),
(2) Date: Jan. 8, 2016

(87) PCT Pub. No.: WO2015/005315
PCT Pub. Date: Jan. 15, 2015

(65) Prior Publication Data
US 2016/0374130 A1  Dec. 22, 2016

(30) Foreign Application Priority Data
Jul. 9, 2013  (JP) ................. 2013-144028

(51) Int. Cl.
*H04W 76/02* (2009.01)
*H04W 8/00* (2009.01)
*H04W 72/04* (2009.01)

(52) U.S. Cl.
CPC ......... *H04W 76/023* (2013.01); *H04W 8/005* (2013.01); *H04W 72/042* (2013.01); *H04W 72/0413* (2013.01); *H04W 72/0453* (2013.01)

(58) Field of Classification Search
None
See application file for complete search history.

(56) References Cited

U.S. PATENT DOCUMENTS 8,660,550 B2 *  2/2014  Jung ................... H04W 76/023
                                                      375/265
9,179,382 B2 *  11/2015 Madan ................. H04W 36/18
9,338,807 B2 *  5/2016  Kwon ................. H04W 52/242
(Continued)

FOREIGN PATENT DOCUMENTS

WO      2012068294 A1    5/2012

OTHER PUBLICATIONS

3GPP TR 22.803, V12.1.0 (Mar. 2013), 3rd Generation Partnership Project; Technical Specification Group Services and System Aspects; Feasibility study for Proximity Services (ProSe), (Release 12), pp. 1-45.
(Continued)

*Primary Examiner* — Hong Cho
(74) *Attorney, Agent, or Firm* — Studebaker & Brackett PC

(57) ABSTRACT eNB 200 controls a UE group including a plurality of UEs 100 (UE 100-1 and UE 100-2) that support cellular communication and D2D communication. The eNB 200 selects a communication mode for applying to the UE group from the cellular communication and the D2D communication, based on first channel information on a channel state between the UEs 100 (UE-UE) included in the UE group and second channel information on a channel state between the eNB 200 and the UEs 100 included in the UE group (UE-eNB).

2 Claims, 11 Drawing Sheets

(56) References Cited

U.S. PATENT DOCUMENTS

| | | | | |
|---|---|---|---|---|
| 9,445,424 B2* | 9/2016 | Nordstrom | ............ | H04W 72/085 |
| 9,497,672 B2* | 11/2016 | Jang | ...................... | H04W 36/30 |
| 2012/0129562 A1* | 5/2012 | Stamoulis | ............ | H04W 76/023 |
| | | | | 455/517 |
| 2012/0184306 A1* | 7/2012 | Zou | ...................... | H04W 76/023 |
| | | | | 455/458 |
| 2013/0294296 A1* | 11/2013 | Dimou | ................. | H04W 72/082 |
| | | | | 370/280 |
| 2013/0308598 A1* | 11/2013 | Madan | ................. | H04W 36/18 |
| | | | | 370/331 |

OTHER PUBLICATIONS

International Search Report and Written Opinion of PCT/JP2014/068135 dated Oct. 14, 2014.

* cited by examiner

NETWORK APPARATUS AND USER TERMINAL

TECHNICAL FIELD

The present invention relates to a network apparatus and a user terminal used in a mobile communication system that supports D2D communication.

BACKGROUND ART

In 3GPP (3rd Generation Partnership Project) that is a standardization project of a mobile communication system, as a new feature of release 12 or later, introduction of Device to Device (D2D) communication has been considered (see Non Patent Literature 1).

In D2D communication, a plurality of user terminals that is adjacent to each other perform direct device to device communication without going through a network. On the other hand, in cellular communication that is normal communication of the mobile communication system, the user terminals perform communication through the network.

CITATION LIST

Non Patent Literature

Non Patent Literature 1: 3GPP technical report "TR 22.803 V12.1.0" March 2013

SUMMARY OF INVENTION

A data transmission rate of D2D communication performed between adjacent user terminals is generally higher than the data transmission rate of cellular communication. Therefore, as a communication mode for applying to the user terminals, it is considered that the D2D communication is always prioritized over the cellular communication.

However, the data transmission rate of the D2D communication is not necessarily to be higher than the data transmission rate of the cellular communication. When, for example, a user terminal is adjacent to a base station, the cellular communication may have a higher data transmission rate in comparison with the D2D communication.

Therefore, the present invention aims to provide a network apparatus and a user terminal capable of appropriately selecting the communication mode.

A network apparatus according to a first aspect controls a user terminal group including a plurality of user terminals that support both cellular communication in which a data path goes through a network and D2D communication that is direct device to device communication in which a data path does not go through the network. The network apparatus includes a controller configured to select a communication mode for applying to the user terminal group from the cellular communication and the D2D communication, based on first channel information on a channel state between the user terminals included in the user terminal group and second channel information on a channel state between the network and the user terminals included in the user terminal group.

A user terminal according to a second aspect is included in a user terminal group including a plurality of user terminals that support both cellular communication in which a data path goes through a network and D2D communication that is direct device to device communication in which a data path does not go through the network. The user terminal includes a controller configured to select a communication mode for applying to the user terminal group from the cellular communication and the D2D communication, based on first channel information on a channel state between the user terminals included in the user terminal group and second channel information on a channel state between the network and the user terminals included in the user terminal group.

DESCRIPTION OF EMBODIMENTS

[Overview of Embodiments]

Figure 1:
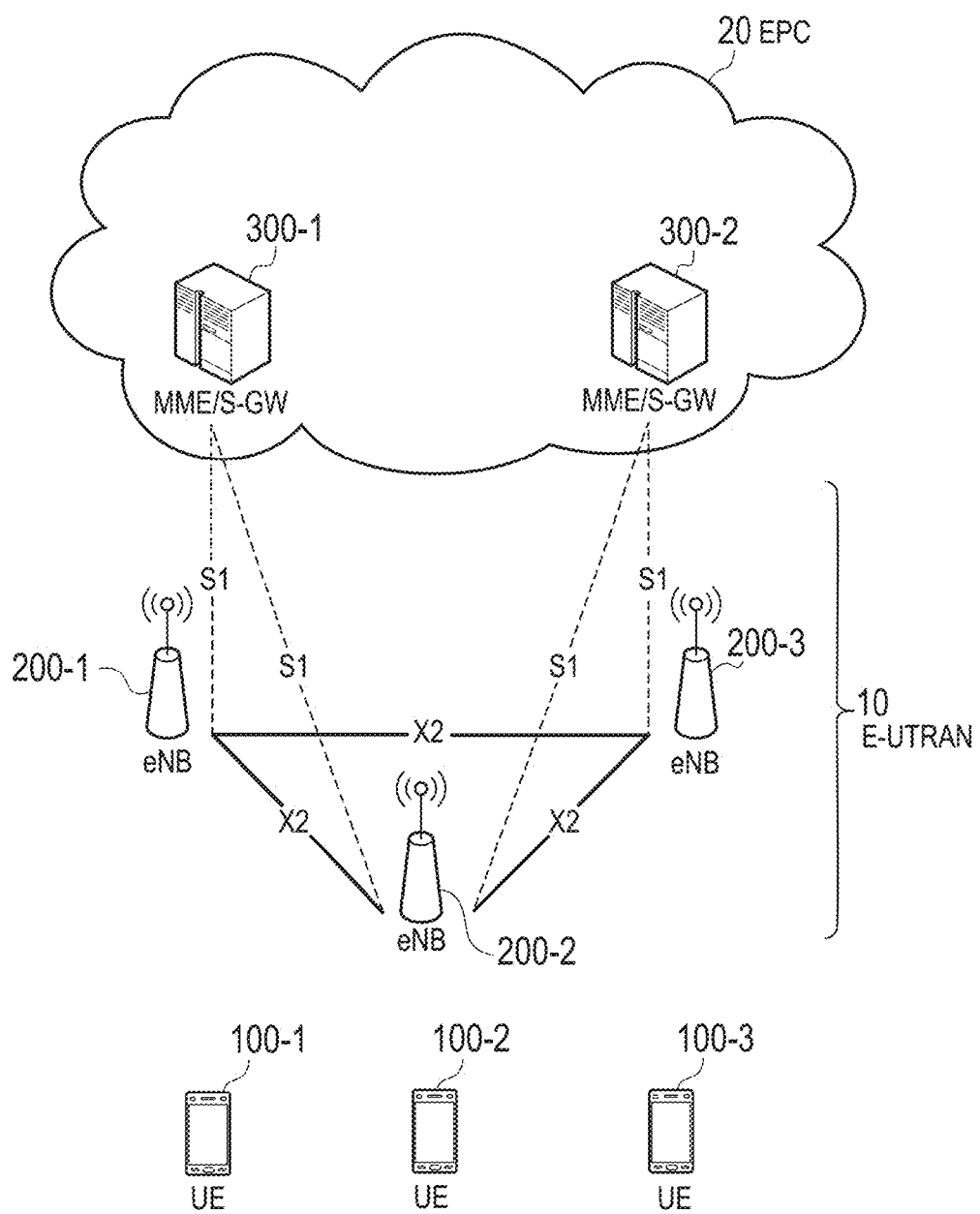
FIG. 1 is a configuration diagram of an LTE system according to a first embodiment and a second embodiment.

A network apparatus according to a first embodiment controls a user terminal group including a plurality of user terminals that support both cellular communication in which a data path goes through a network and D2D communication that is direct device to device communication in which a data path does not go through the network. The network apparatus includes a controller configured to select a communication mode for applying to the user terminal group from the cellular communication and the D2D communication, based on first channel information on a channel state between the user terminals included in the user terminal group and second channel information on a channel state between the network and the user terminals included in the user terminal group.

In the first embodiment, the controller selects the communication mode by comparing D2D communication efficiency derived from the first channel information with cellular communication efficiency derived from the second channel information.

In the first embodiment, the D2D communication efficiency is a statistic of data transmission rate of each user terminal included in the user terminal group in a case of assuming that the each user terminal performs the D2D communication. The cellular communication efficiency is a statistic of data transmission rate of each user terminal included in the user terminal group in a case of assuming that the each user terminal performs the D2D communication.

In the first embodiment, the D2D communication is performed by utilizing an uplink radio resource or a downlink radio resource of a mobile communication system. The D2D communication efficiency and/or the cellular communication efficiency reflect utilization efficiency of respective radio resources of the D2D communication and the cellular communication.

In the first embodiment, the controller selects the D2D communication as the communication mode when the D2D communication efficiency is higher than the cellular communication efficiency. The controller selects the cellular communication as the communication mode when the cellular communication efficiency is higher than the D2D communication efficiency.

In the first embodiment, the first channel information is information indicating a channel state on a frequency band available for the D2D communication. The second channel information is information indicating a channel state on a frequency band available for the cellular communication.

In the first embodiment, the network apparatus receives the first channel information from the user terminals included in the user terminal group. The controller uses, for the comparison, the D2D communication efficiency derived from the received first channel information.

In the first embodiment, the network apparatus receives the D2D communication efficiency from the user terminals included in the user terminal group. The controller uses, for the comparison, the received D2D communication efficiency.

A user terminal according to a second embodiment is included in a user terminal group including a plurality of user terminals that support cellular communication in which a data path goes through a network and D2D communication that is direct device to device communication in which a data path does not go through the network. The user terminal includes a controller configured to select a communication mode for applying to the user terminal group from the cellular communication and the D2D communication, based on first channel information on a channel state between the user terminals included in the user terminal group and second channel information on a channel state between the network and the user terminals included in the user terminal group.

In the second embodiment, the controller selects the communication mode by comparing D2D communication efficiency derived from the first channel information with cellular communication efficiency derived from the second channel information.

In the second embodiment, the D2D communication efficiency is a statistic of a data transmission rate of each user terminal included in the user terminal group in a case of assuming that the each user terminal performs the D2D communication. The cellular communication efficiency is a statistic of data transmission rate of each user terminal included in the user terminal group in a case of assuming that the each user terminal performs the D2D communication.

In the second embodiment, the D2D communication is performed by utilizing an uplink radio resource or a downlink radio resource of a mobile communication system. The D2D communication efficiency and/or the cellular communication efficiency reflect utilization efficiency of respective radio resources of the D2D communication and the cellular communication.

In the second embodiment, the controller selects the D2D communication as the communication mode when the D2D communication efficiency is higher than the cellular communication efficiency. The controller selects the cellular communication as the communication mode when the cellular communication efficiency is higher than the D2D communication efficiency.

In the second embodiment, the first channel information is information indicating a channel state on a frequency band available for the D2D communication. The second channel information is information indicating a channel state on a frequency band available for the cellular communication.

First Embodiment

In the following, an embodiment is described when the present invention is applied to an LTE system.

(System Configuration)

FIG. 1 is a configuration diagram of an LTE system according to a first embodiment. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell) with which a connection is established. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

Figure 2:
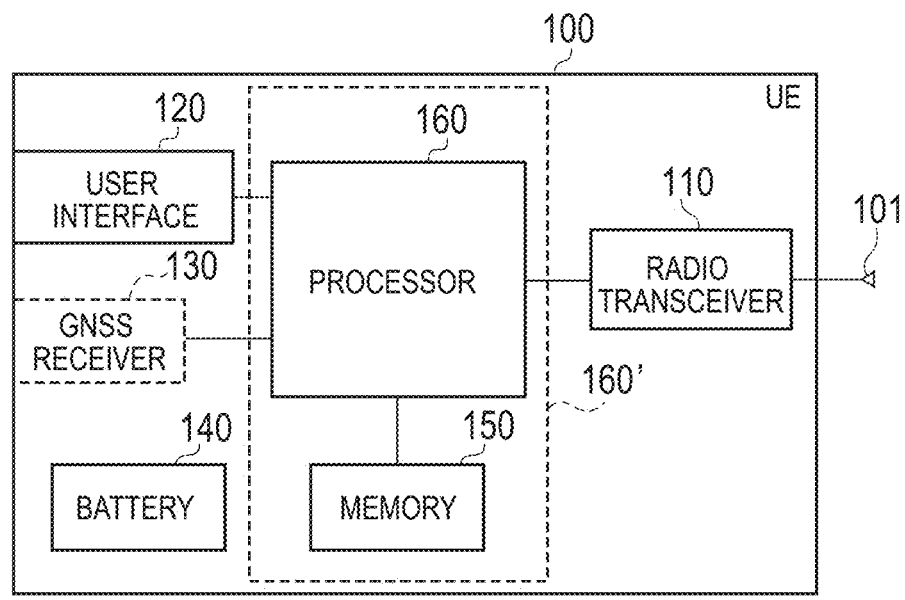
FIG. 2 is a block diagram of UE according to the first embodiment and the second embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
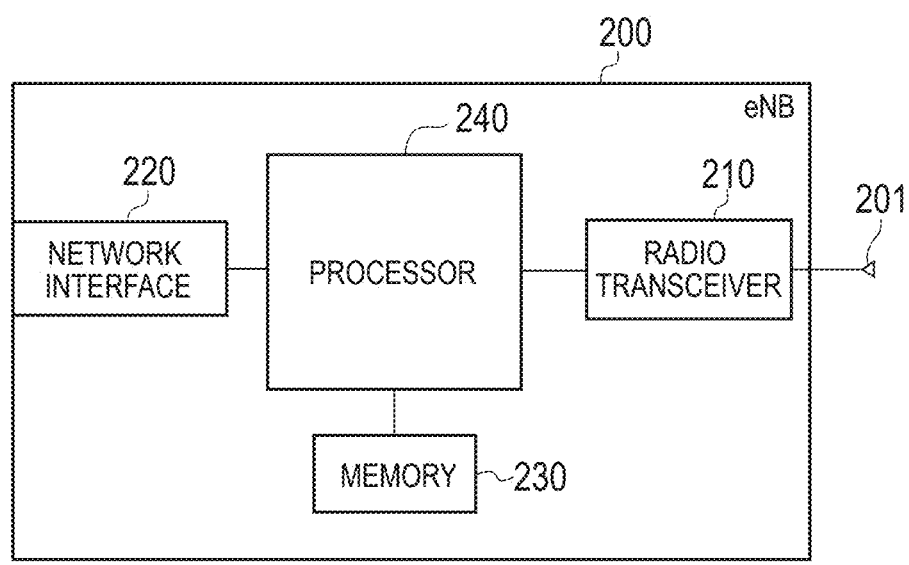
FIG. 3 is a block diagram of an eNB according to the first embodiment and the second embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
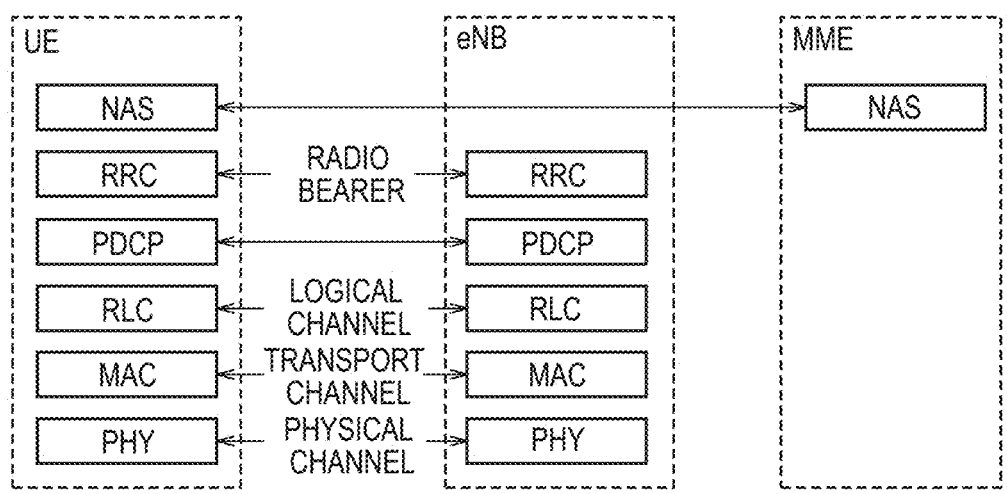
FIG. 4 is a protocol stack diagram of a radio interface according to the first embodiment and the second embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), otherwise the UE 100 is in an idle state (an RRC idle state).

A NAS (Non-Access Stratum) layer positioned above the RRC layer performs a session management, a mobility management and the like.

Figure 5:
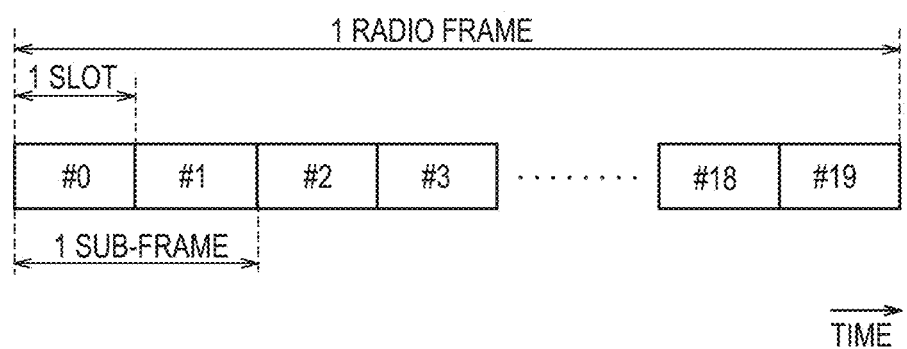
FIG. 5 is a configuration diagram of a radio frame according to the first embodiment and the second embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. One subcarrier and one symbol constitute one resource element.

Among radio resources assigned to the UE 100, a frequency resource can be specified by a resource block and a time resource can be specified by a subframe (or slot).

In the downlink (DL), an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink (UL), both ends in the frequency direction of each subframe are control regions used as a physical uplink control channel (PUCCH) for mainly transmitting a control signal. Furthermore, the other portion in the frequency direction of each subframe is a region available as a physical uplink shared channel (PUSCH) for mainly transmitting user data.

(D2D Communication)

The LTE system according to a first embodiment supports D2D communication that is direct device to device communication (UE-UE communication). Here, the D2D communication is described comparing with cellular communication that is normal communication of the LTE system. The cellular communication is a communication mode in which a data path goes through a network (E-UTRAN 10, EPC 20). The data path is a communication path of user data. On the other hand, the D2D communication is a communication mode in which the data path to be set between the UEs does not go through the network.

Figure 6:
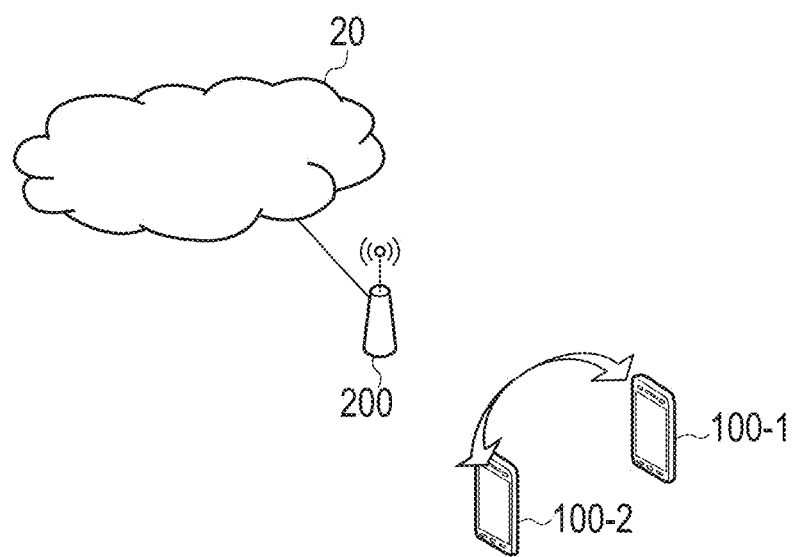
FIG. 6 is a diagram illustrating D2D communication according to the first embodiment and the second embodiment.

FIG. 6 is a diagram illustrating the D2D communication. As illustrated in FIG. 6, in the D2D communication, the data path does not go through an eNB 200. UE 100-1 and UE 100-2 that are adjacent to each other perform radio communication directly with a low transmission power in a cell of the eNB 200. In this way, the adjacent UE 100-1 and UE 100-2 perform the radio communication directly with the low transmission power, so that it is possible to reduce power consumption of UE 100 and to decrease interference to an adjacent cell, in comparison with the cellular communication.

(Operation According to First Embodiment)

In the following, operation according to the first embodiment is described.

(1) Operation Outline

Figure 7:
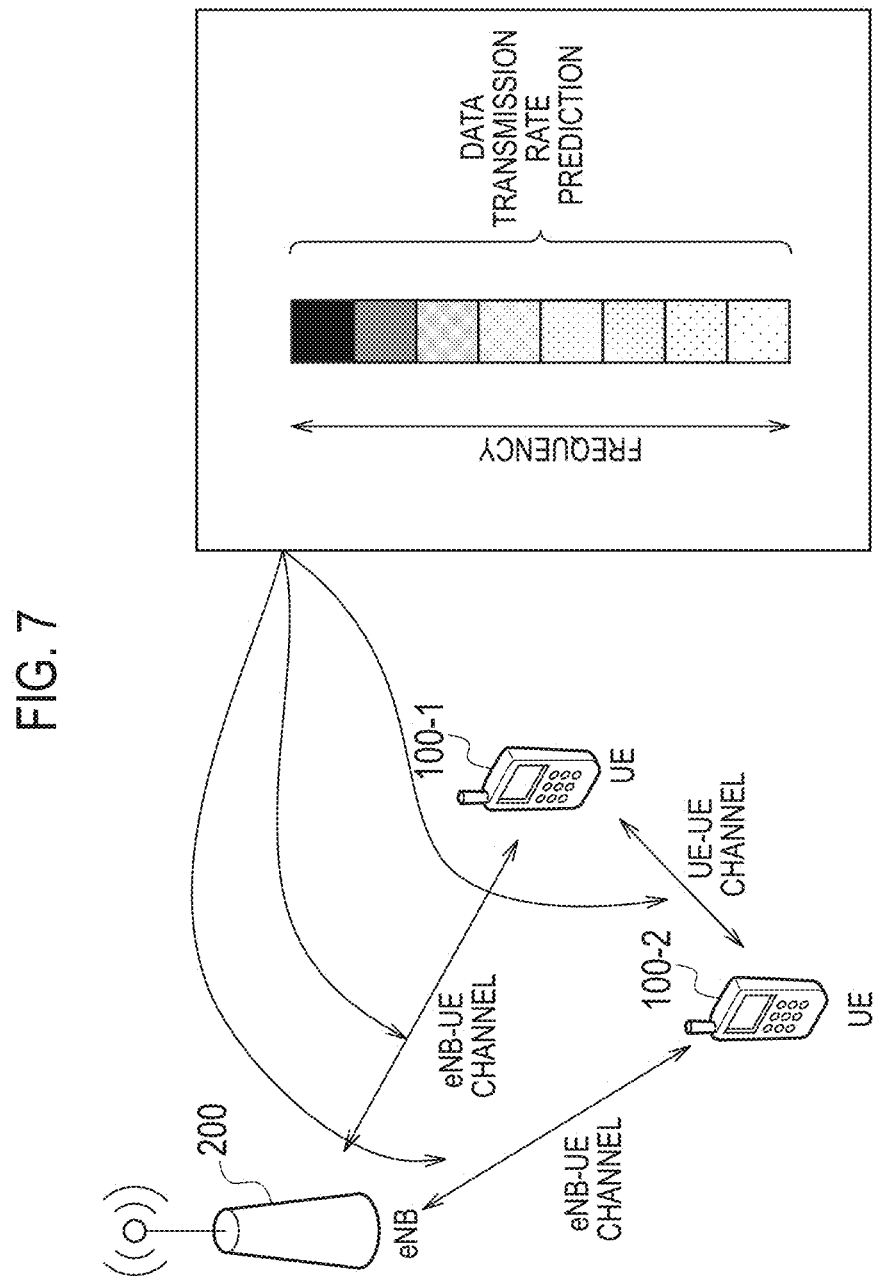
FIG. 7 is a diagram illustrating an operation outline of the first embodiment.

FIG. 7 is a diagram illustrating an operation outline of the first embodiment. As illustrated in FIG. 7, a plurality of UEs 100 (UE 100-1 and UE 100-2) exists in the cell managed by the eNB 200. Here, "exist in" does not matter whether the UE 100 is in an idle state (RRC idle state) or in a connected state (RRC connected state); however, in the first embodiment, it supposes a case in which each UE 100 is in the connected state.

The eNB 200 according to the first embodiment controls a UE group including the plurality of UEs 100 (UE 100-1 and UE 100-2) that supports the cellular communication and the D2D communication. The eNB 200 selects the communication mode for applying to the UE group based on first channel information on a channel state between the UEs 100 (UE-UE) included in the UE group and second channel information on a channel state between the eNB 200 and the UE 100 included in the UE group (eNB-UE). Accordingly, the communication mode of the UE 100-1 and 100-2 can be selected collectively as one unit of the UE group including the UE 100-1 and 100-2. In addition, since it can be selected based on the channel state whether performing the cellular communication or performing the D2D communication, it is possible to appropriately select the communication mode.

In a case in which switching determination is performed from the D2D communication to the cellular communication, the "UE group" is the plurality of UEs 100 performing the D2D communication with each other as communication partners. On the other hand, in a case in which switching determination is performed from the cellular communication to the D2D communication, the "UE group" is the plurality of UEs 100 performing the cellular communication with each other as the communication partners and being adjacent to each other. Alternatively, in a case in which any one of the D2D communication or the cellular communication is selected when the communication is started from a state in which neither the D2D communication nor the cellular communication is performed (however, a control signal can be transmitted and received), the "UE group" is the plurality of UEs 100 measuring the first channel information and the second channel information and being adjacent to each other.

The eNB 200 selects the communication mode by comparing D2D communication efficiency derived from the first channel information and cellular communication efficiency derived from the second channel information with each other. In the first embodiment, the eNB 200 selects the D2D communication as the communication mode when the D2D communication efficiency is higher than the cellular communication efficiency. The eNB 200 selects the cellular communication as the communication mode when the cellular communication efficiency is higher than the D2D communication efficiency.

The D2D communication efficiency is a statistic of a data transmission rate of each UE 100 when each of the UE 100 included in the UE group performs the D2D communication (hereinafter referred to as "UE-UE data transmission rate"). The cellular communication efficiency is a statistic of a data transmission rate of each UE 100 when each of the UE 100 included in the UE group performs the cellular communication (hereinafter referred to as "eNB-UE data transmission rate"). In this way, as an entire of the UE group, the higher communication efficiency is evaluated by comparing the communication efficiency of the D2D communication and the cellular communication with each other, so that the communication mode can be appropriately selected for applying to the UE group.

In the first embodiment, the D2D communication is performed by utilizing an uplink radio resource or a downlink radio resource of a mobile communication system (LTE system). The D2D communication efficiency and/or the cellular communication efficiency reflect utilization efficiency of respective radio resources of the D2D communication and the cellular communication. Normally, the D2D communication has a higher utilization efficiency of the radio resource in comparison with the cellular communication. Therefore, the D2D communication efficiency is evaluated relatively higher than the cellular communication efficiency, so that improvement of efficiency of an entire system can be achieved.

In the first embodiment, the first channel information is information indicating a channel state of a frequency band available for the D2D communication. The second channel information is information indicating a channel state of a frequency band available for the cellular communication. Thus, it is possible to obtain more accurate channel information.

In the first embodiment, the eNB 200 receives the first channel information from the UE 100 included in the UE group. The eNB 200 uses the D2D communication efficiency (UE-UE data transmission rate) to be derived from the first channel information received for comparison with the cellular communication efficiency. Alternatively, the eNB 200 receives the D2D communication efficiency (UE-UE data transmission rate) from the UE 100 included in the UE group. The eNB 200 uses the D2D communication efficiency received for comparison with the cellular communication efficiency.

EXAMPLE (2.1) Example of Operation Sequence

Figure 8:
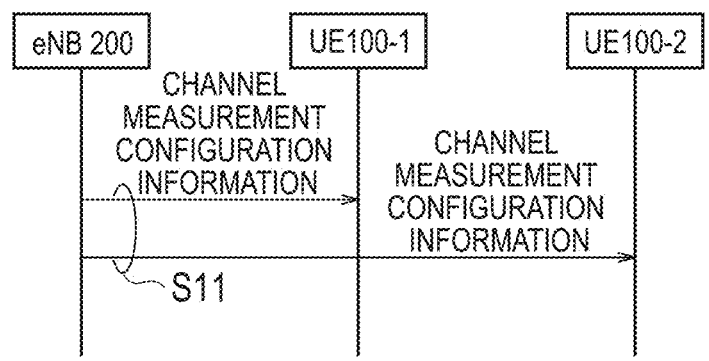
FIG. 8 is a sequence diagram illustrating common pre-operation in operation patterns 1 to 3 according to the first embodiment.

Next, as an example of an operation sequence according to the first embodiment, operation patterns 1 to 3 are described. FIG. 8 is a sequence diagram illustrating common pre-operation in the operation patterns 1 to 3. As illustrated in FIG. 8, the eNB 200 transmits channel measurement setting information indicating a setting of channel measurement (measurement timing, report timing, report content, and the like) to the UE 100-1 and UE 100-2. The report timing includes a periodic trigger or an event trigger. In the periodic trigger, a period to be reported can be specified. In the event trigger, an event (for example, update of a measurement result) can be specified.

Figure 9:
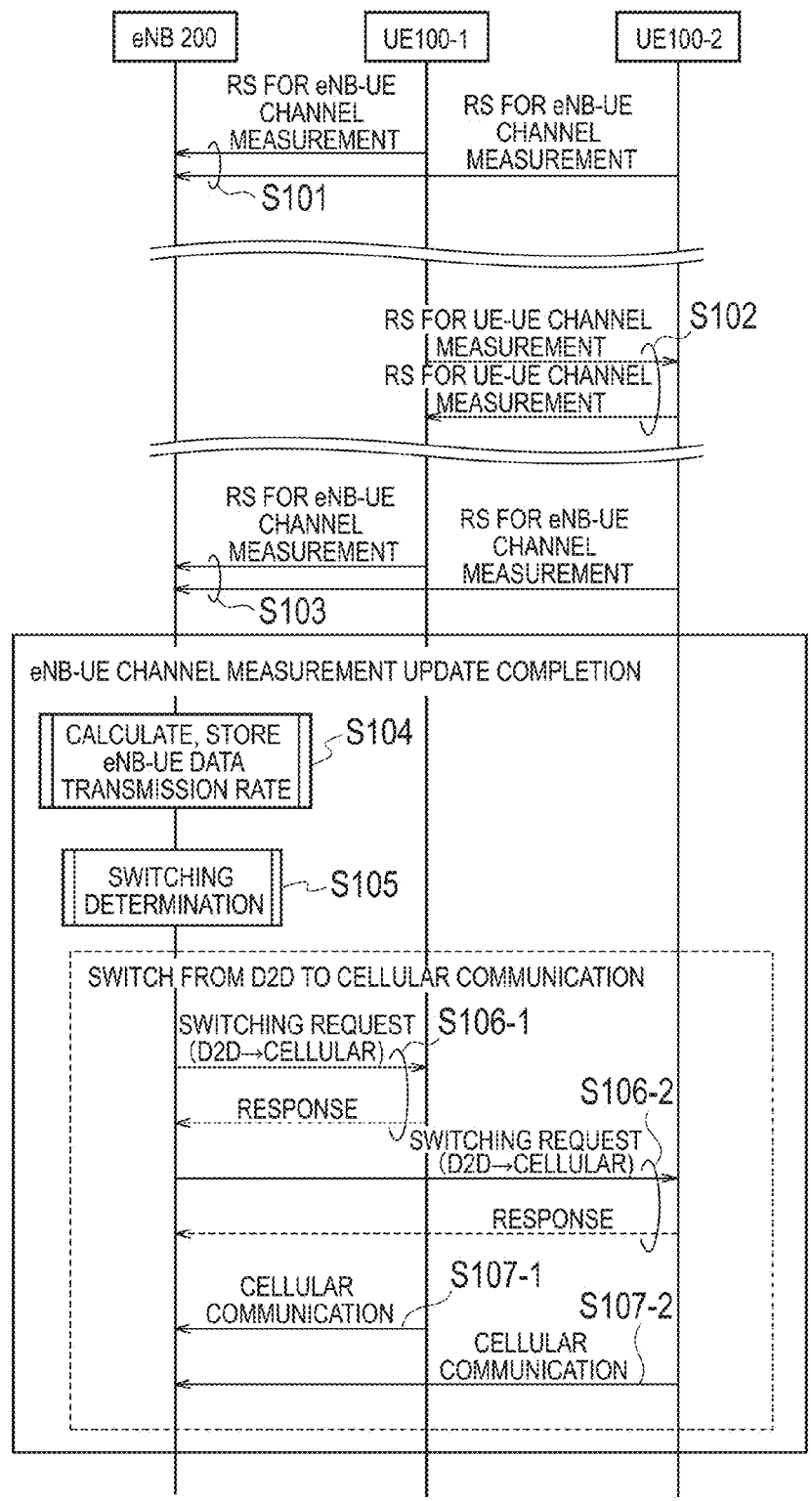
FIG. 9 is a sequence diagram of the operation pattern 1 according to the first embodiment.

FIG. 9 is a sequence diagram of the operation pattern 1. The operation pattern 1 is operation for switching from the D2D communication to the cellular communication. In the operation pattern 1, it is assumed that the eNB 200, before the switching procedure, acquires in advance the UE-UE data transmission rate from each of the UE 100-1 and UE 100-2.

As illustrated in FIG. 9, at step S101, each of the UE 100-1 and UE 100-2 transmits a reference signal (RS) for eNB-UE channel measurement to the eNB 200. The eNB 200 performs channel measurement based on each reference signal received to acquire the second channel information for each of the UE 100-1 and UE 100-2.

At step S102, each of the UE 100-1 and UE 100-2 transmits and receives the reference signal for UE-UE channel measurement. Each of the UE 100-1 and UE 100-2 performs channel measurement based on the reference signal received to acquire the first channel information.

At step S103, each of the UE 100-1 and UE 100-2 transmits the reference signal (RS) for eNB-UE channel measurement to the eNB 200. The eNB 200 performs channel measurement based on each reference signal received to acquire the second channel information for each of the UE 100-1 and UE 100-2.

At step S104, the eNB 200 derives the eNB-UE data transmission rate from the second channel information to store.

At step S105, the eNB 200 compares the D2D communication efficiency based on the UE-UE data transmission rate and the cellular communication efficiency based on the eNB-UE data transmission rate with each other to perform switching determination. The eNB 200, when the cellular communication efficiency is higher than the D2D communication efficiency, selects the cellular communication as the communication mode and determines to switch from the D2D communication to the cellular communication.

At step S106, the eNB 200 transmits a switching request to the cellular communication to the UE 100-1 and UE 100-2. The UE 100-1 and UE 100-2 can return a response to the switching request to the eNB 200.

At step S107, the UE 100-1 and UE 100-2 switch from the D2D communication to the cellular communication to perform the cellular communication.

Figure 10:
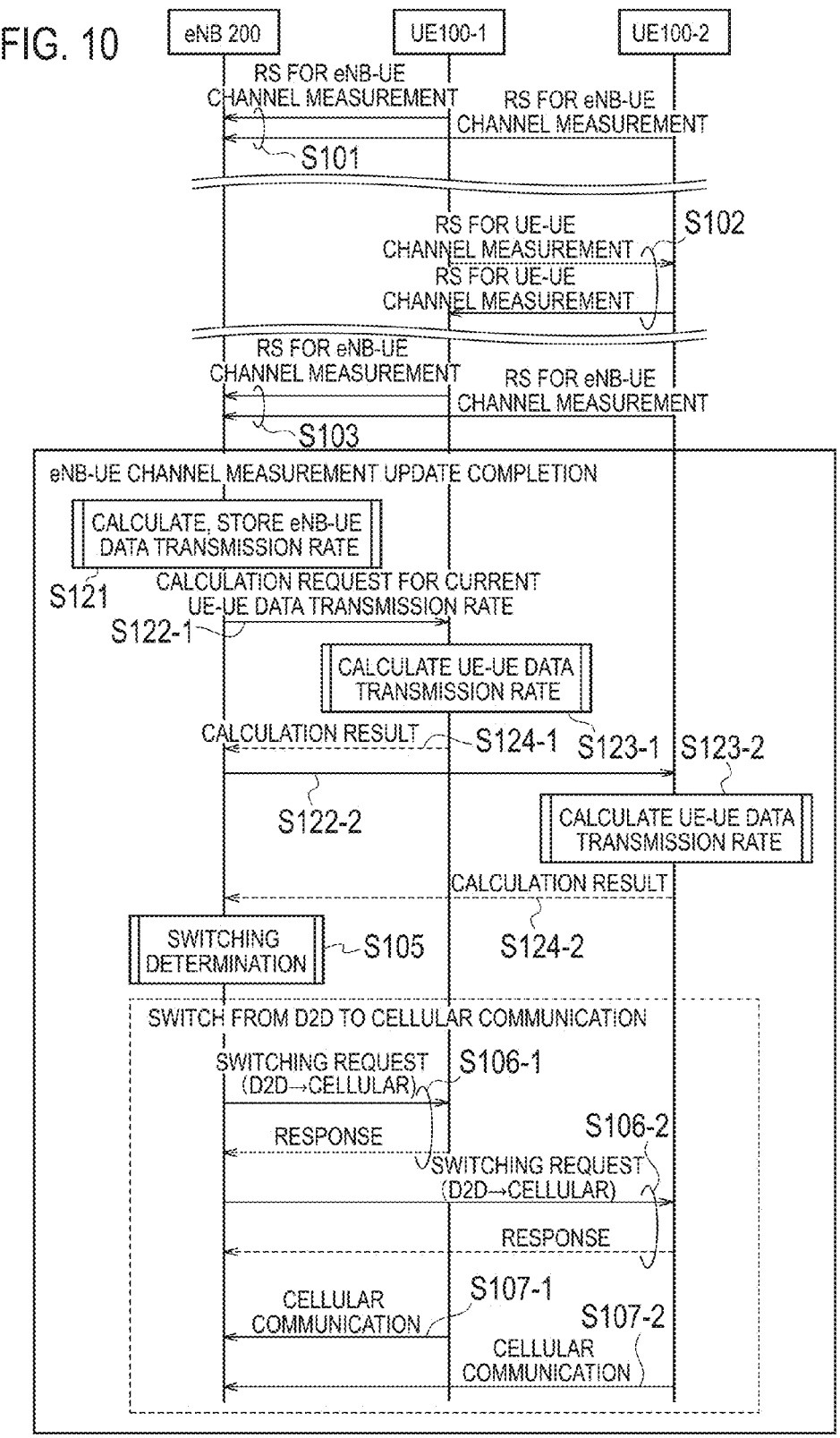
FIG. 10 is a sequence diagram of the operation pattern 2 according to the first embodiment.

FIG. 10 is a sequence diagram of the operation pattern 2. The operation pattern 2 is operation for switching from the D2D communication to the cellular communication. Here, a difference from the operation pattern 1 is described.

As illustrated in FIG. 10, at step S121, the eNB 200 derives the eNB-UE data transmission rate from the second channel information to store.

At step S122, the eNB 200, to acquire the UE-UE data transmission rate before reaching the report timing specified by the channel measurement setting information illustrated in FIG. 8, transmits a calculation request for a current UE-UE data transmission rate to the UE 100-1 and UE 100-2. Each of the UE 100-1 and UE 100-2 calculates the current UE-UE data transmission rate (step S123), and transmits the current UE-UE data transmission rate to the eNB 200 (step S124).

At step S105, the eNB 200 compares the D2D communication efficiency based on the UE-UE data transmission rate and the cellular communication efficiency based on the eNB-UE data transmission rate with each other to perform switching determination. The eNB 200, when the cellular communication efficiency is higher than the D2D communication efficiency, selects the cellular communication as the communication mode and determines to switch from the D2D communication to the cellular communication. Subsequent operation is the same as the operation pattern 1.

Figure 11:
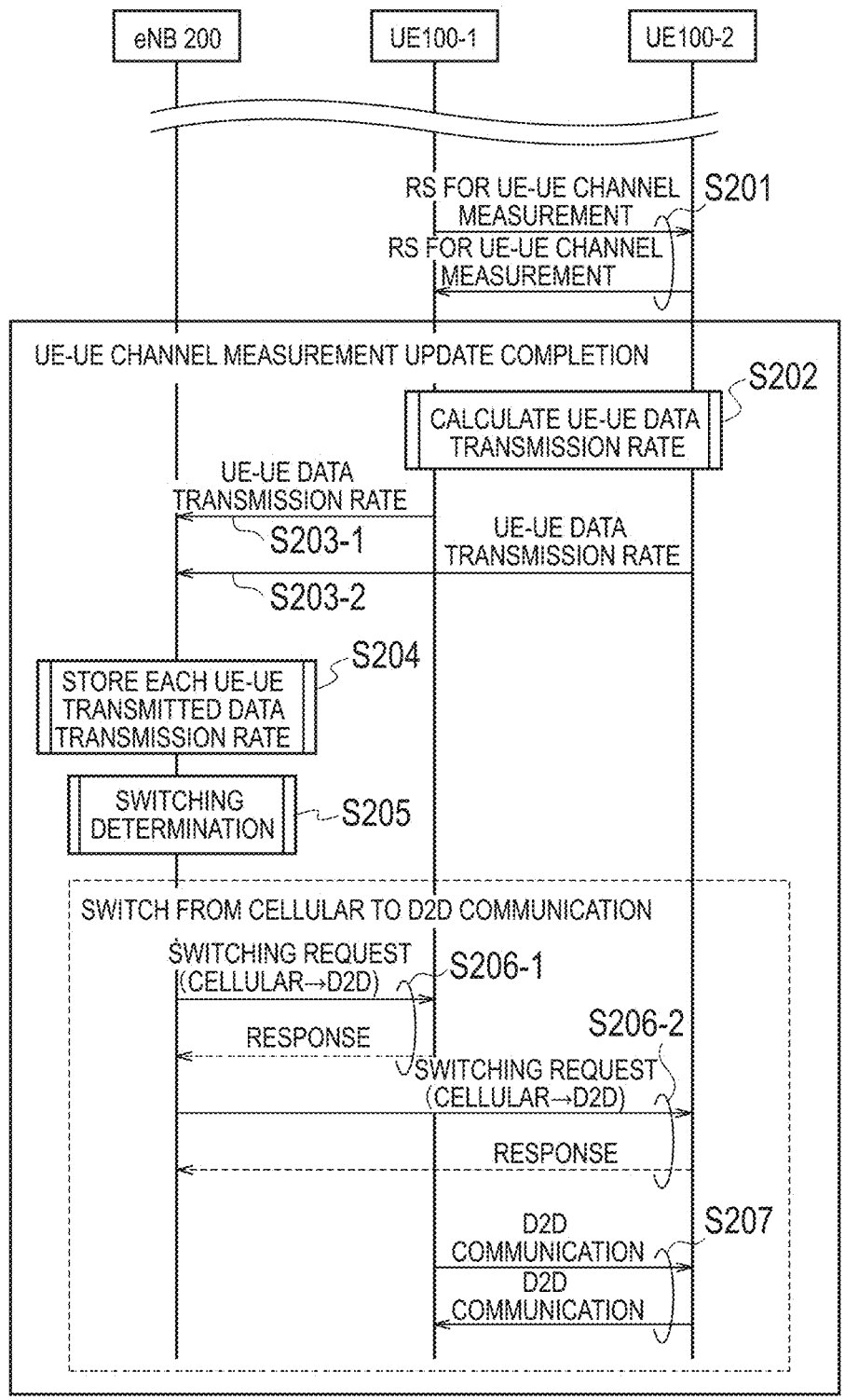
FIG. 11 is a sequence diagram of the operation pattern 3 according to the first embodiment.

FIG. 11 is a sequence diagram of the operation pattern 3. The operation pattern 3 is operation for switching from the cellular communication to the D2D communication. In the operation pattern 1, it is assumed that the eNB 200 acquires in advance the eNB-UE data transmission rate before the switching procedure.

As illustrated in FIG. 11, at step S201, each of the UE 100-1 and UE 100-2 transmits and receives the reference signal for the UE-UE channel measurement. Each of the UE 100-1 and UE 100-2 performs channel measurement based on the reference signal received to acquire the first channel information.

At step S202, each of the UE 100-1 and UE 100-2 derives the UE-UE data transmission rate from the first channel information.

At step S203, each of the UE 100-1 and UE 100-2 transmits the UE-UE data transmission rate to the eNB 200.

At step S204, the eNB 200 stores the UE-UE data transmission rate received from each of the UE 100-1 and UE 100-2.

At step S205, the eNB 200 compares the D2D communication efficiency based on the UE-UE data transmission rate and the cellular communication efficiency based on the eNB-UE data transmission rate with each other to perform switching determination. The eNB 200, when the D2D communication efficiency is higher than the cellular communication efficiency, selects the D2D communication as the communication mode and determines to switch from the cellular communication to the D2D communication.

At step S206, the eNB 200 transmits a switching request to the D2D communication to the UE 100-1 and UE 100-2. The UE 100-1 and UE 100-2 can return a response to the switching request to the eNB 200.

At step S207, the UE 100-1 and UE 100-2 switch from the cellular communication to the D2D communication to perform the D2D communication.

(2.2) Example of Communication Efficiency Derivation Method

Figure 12:
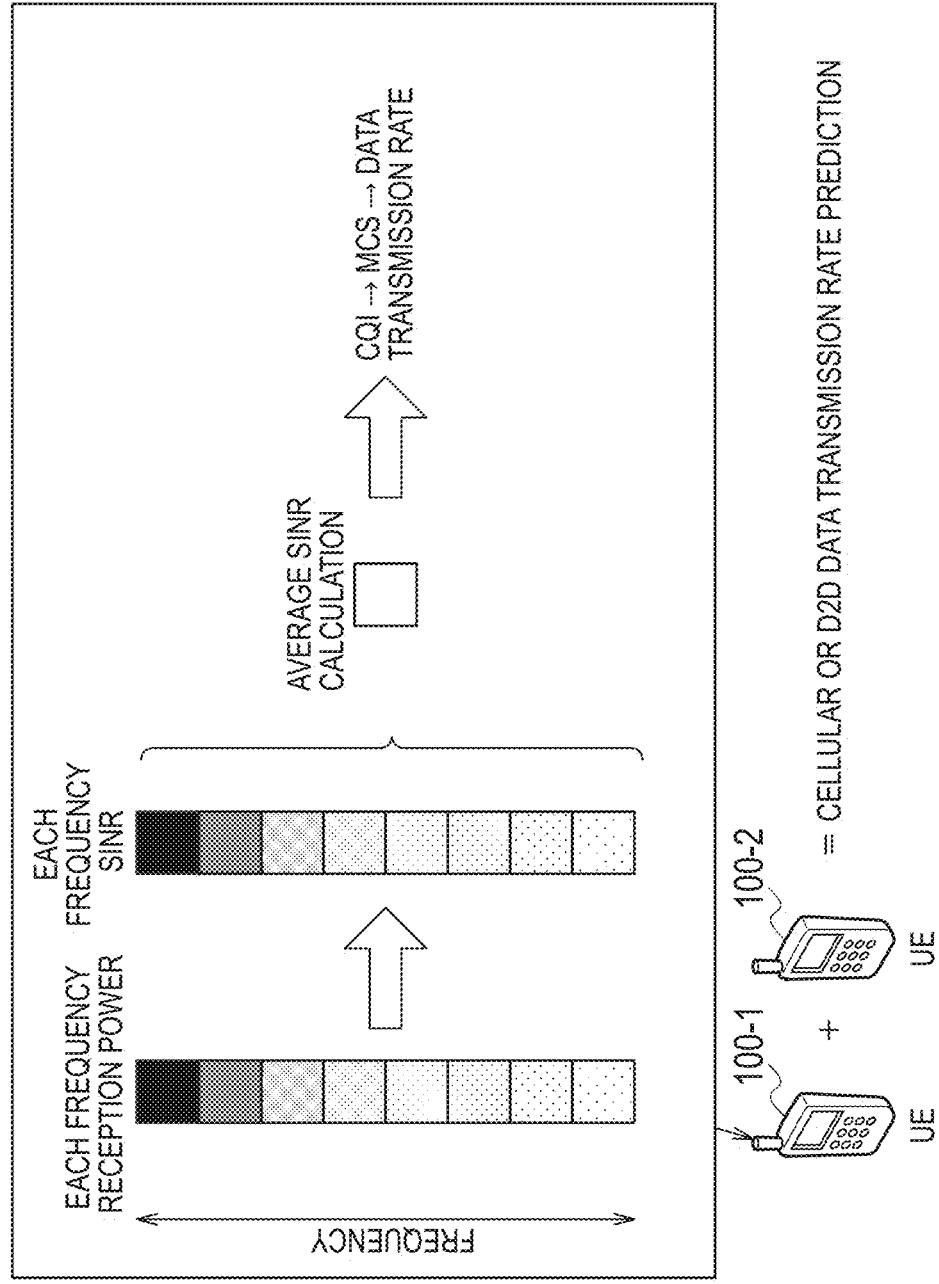
FIG. 12 is a diagram illustrating a derivation method of communication efficiency according to the first embodiment and the second embodiment.

FIG. 12 is a diagram illustrating a derivation method of communication efficiency. First, a derivation method of the D2D communication efficiency is described. As illustrated in FIG. 12, each UE 100 acquires the first channel information on a UE-UE channel state. The first channel information is information indicating the channel state of the frequency band available for the D2D communication (available resource block). The first channel information is, for example, a combined SINR (Signal-to-Interference plus Noise power Ratio) (average SINR or effective SINR) of an SINR for each available resource block. An effective SINR is an SINR in which error correction is considered, being different from an average SINR obtained by simple averaging. Next, each UE 100 or the eNB 200 derives the UE-UE data transmission rate from the first channel information. For example, each UE 100 or the eNB 200 converts the first channel information to an indicator of channel quality (for example, CQI: Channel Quality Indicator), and identifies a modulation and coding scheme (MCS) corresponding to the indicator, and makes a unit data size (for example, TBS: Transport Block Size) corresponding to the MCS be the UE-UE data transmission rate. Then, the eNB 200 derives a statistic of the UE-UE data transmission rate of each UE 100 as the D2D communication efficiency. The statistic includes, for example, the total, average, maximum, minimum, or mode. Thus, basic D2D communication efficiency is derived.

Next, a derivation method of the cellular communication efficiency is described. Each UE 100 or the eNB 200 acquires the second channel information on the eNB-UE channel state. The second channel information is information indicating the channel state of the frequency band available for the cellular communication (available resource block). The second channel information is, for example, the combined SINR (average SINR or effective SINR) of the SINR for each available resource block. Next, each UE 100 or the eNB 200 derives the eNB-UE data transmission rate from the first channel information. For example, each UE 100 or the eNB 200 converts the second channel information to the indicator of channel quality, and identifies an MCS corresponding to the indicator, and makes a unit data size corresponding to the MCS be the eNB-UE data transmission rate. Then, the eNB 200 derives a statistic of the eNB-UE data transmission rate of each UE 100 as the cellular communication efficiency. The statistic includes, for example, the total, average, maximum, minimum, or mode. Thus, basic cellular communication efficiency is derived.

The basic D2D communication efficiency and the basic cellular communication efficiency can be used for comparison as they are; however, they can be compared with each other after performing adjustment from a viewpoint of efficiency of the entire system. For example, a positive offset is added to the basic D2D communication efficiency; alternatively, a negative offset is added to the basic cellular communication efficiency. Normally, the D2D communication has a high utilization efficiency of the radio resource in comparison with the cellular communication, so that the D2D communication efficiency is evaluated relatively higher than the cellular communication efficiency.

(2.3) Message Format

As a message to be transmitted from the UE 100 to the eNB 200, various kinds are supposed.

When the UE-UE data transmission rate (or first channel information) is transmitted from the UE 100 to the eNB 200, the message can include an identifier of one UE 100, an identifier of the other UE, and the UE-UE data transmission rate (or first channel information). Alternatively, when an identifier is assigned to the UE group, the message can include the identifier of the UE group and UE-UE data transmission rate (or first channel information).

When the eNB-UE data transmission rate (or second channel information) is transmitted from the UE 100 to the eNB 200, the message can include an identifier of the cell of the eNB 200, an identifier of the UE 100, and the eNB-UE data transmission rate (or second channel information).

In addition, the first channel information and the second channel information can be the SINR or CQI for each resource block, and can be the SINR or CQI for each sub-band, and can be the SINR or CQI for an entire band (wide band). Alternatively, instead of the SINR or CQI, a channel characteristic matrix or path loss can be used.

Conclusion of First Embodiment

As described above, the eNB 200 controls the UE group including the plurality of UEs 100 (UE 100-1 and UE 100-2) that supports the cellular communication and the D2D communication. The eNB 200 selects the communication mode for applying to the UE group based on the first channel information on the channel state between the UEs 100 (UE-UE) included in the UE group and the second channel information on the channel state between the eNB 200 and the UE 100 included in the UE group (eNB-UE). Accordingly, the communication mode of the UE 100-1 and 100-2 can be selected collectively as one unit of the UE group including the UE 100-1 and 100-2. In addition, since it can be selected based on the channel state whether performing the cellular communication or performing the D2D communication, it is possible to appropriately select the communication mode.

Second Embodiment

Next, for second embodiment, a difference from the first embodiment is mainly described. A system configuration and an operating environment of the second embodiment is the same as the first embodiment.

Operation According to Second Embodiment

In the first embodiment described above, the communication mode of a UE group is selected being led by an eNB 200; however, in the second embodiment, the communication mode of the UE group is selected being led by the UE 100. That is, the second embodiment differs from the first embodiment in a determination entity. Other points are the same as the first embodiment.

(1) Operation Outline

The UE 100 according to the second embodiment selects the communication mode for applying to the UE group based on first channel information on a channel state between the UEs 100 (UE-UE) included in the UE group and second channel information on a channel state between the eNB 200 and the UE 100 included in the UE group (eNB-UE). The first channel information is information indicating a channel state of a frequency band available for D2D communication. The second channel information is information indicating a channel state of a frequency band available for cellular communication.

The UE 100 selects the communication mode by comparing D2D communication efficiency to be derived from the first channel information and cellular communication efficiency to be derived from the second channel information with each other. The UE 100, when the D2D communication efficiency is higher than the cellular communication efficiency, selects the D2D communication as the communication mode. The UE 100, when the cellular communication efficiency is higher than the D2D communication efficiency, selects the cellular communication as the communication mode.

The D2D communication efficiency is a statistic of a data transmission rate of each UE 100 when each of the UE 100 included in the UE group performs the D2D communication (UE-UE data transmission rate). The cellular communication efficiency is a statistic of a data transmission rate of each UE 100 when each of the UE 100 included in the UE group performs the cellular communication (eNB-UE data transmission rate). The D2D communication efficiency and/or the cellular communication efficiency can reflect utilization efficiency of respective radio resources of the D2D communication and the cellular communication.

(2) Example of Operation Sequence

Figure 13:
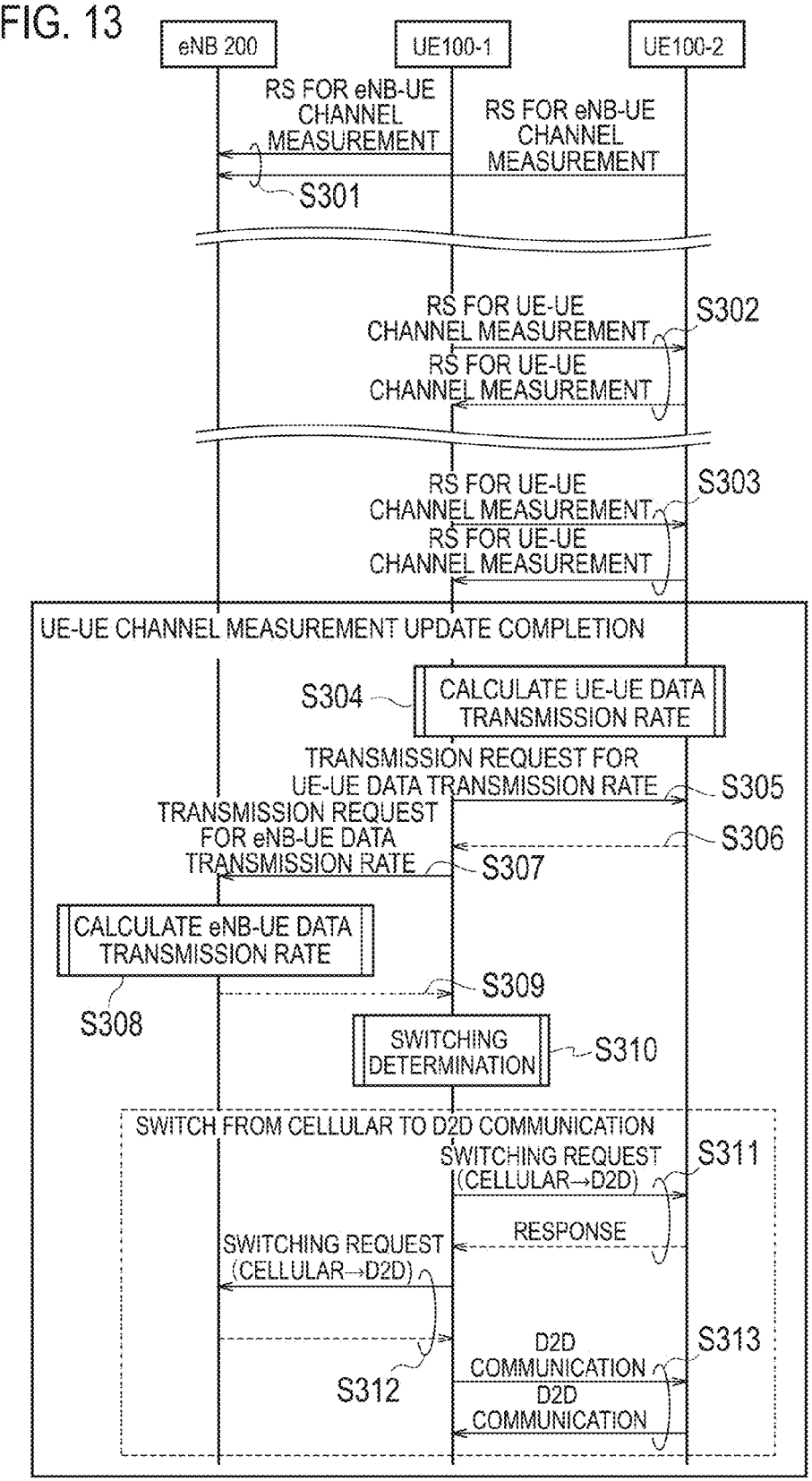
FIG. 13 is a sequence diagram according to the second embodiment.

FIG. 13 is a sequence diagram according to the second embodiment. Here, operation is described for switching from the cellular communication to the D2D communication.

As illustrated in FIG. 13, at step S301, each of UE 100-1 and UE 100-2 transmits a reference signal (RS) for eNB-UE channel measurement to the eNB 200. The eNB 200 performs channel measurement based on each reference signal received to acquire the second channel information for each of the UE 100-1 and UE 100-2.

At steps S302 and S303, each of the UE 100-1 and UE 100-2 transmits and receives the reference signal for UE-UE channel measurement. Each of the UE 100-1 and UE 100-2 performs channel measurement based on the reference signal received to acquire the first channel information.

At step S304, each of the UE 100-1 and UE 100-2 derives the UE-UE data transmission rate from the first channel information.

At step S305, the UE 100-1 transmits a transmission request for the UE-UE data transmission rate to the UE 100-2. The UE 100-2 transmits the UE-UE data transmission rate to the UE 100-1 (step S306).

At step S307, the UE 100-1 transmits a transmission request for the eNB-UE data transmission rate to the eNB 200. The eNB 200 derives the eNB-UE data transmission rate from the second channel information (step S308), and transmits the eNB-UE data transmission rate to the UE 100-1 (step S309).

At step S310, the UE 100-1 compares the D2D communication efficiency based on the UE-UE data transmission rate and the cellular communication efficiency based on the eNB-UE data transmission rate with each other to perform switching determination. The UE 100-1, when the D2D communication efficiency is higher than the cellular communication efficiency, selects the D2D communication as the communication mode, and determines to switch from the cellular communication to the D2D communication.

At steps S311 and S312, the UE 100-1 transmits a switching request to the D2D communication to the UE 100-2 and the eNB 200. The UE 100-2 and the eNB 200 can return a response to the switching request to the UE 100-1.

At step S313, the UE 100-1 and UE 100-2 switch from the cellular communication to the D2D communication to perform the D2D communication.

Other Embodiments

In the embodiments described above, there has been two UEs 100 included in a UE group; however, there can be three or more UEs 100 included in the UE group.

In the embodiments described above, the eNB 200 has been described as an example of a network apparatus according to the present invention; however, the network apparatus according to the present invention is not limited to the eNB 200, and it can be an upper apparatus of the eNB 200 (such as an MME 300 or OAM).

In the embodiments described above, an LTE system has been described as one example of a cellular communication system; however, it is not limited to the LTE system, and the present invention can be applied to a system other than the LTE system.

Entire contents of Japanese Patent Application No. 2013-144028 (filed on Jul. 9, 2013) are incorporated herein by reference.

INDUSTRIAL APPLICABILITY

The present invention is useful in a mobile communication field.

The invention claimed is:

1. A base station that controls a user terminal that supports direct communication in which a data path does not go through a network, the base station comprising:
    a transmitter configured to transmit to the user terminal,
        a measurement instruction message for a measurement of a frequency region available for the direct communication, wherein the frequency region includes a plurality of subchannels, each of the plurality of subchannels including a plurality of resource blocks, and the measurement instruction message indicates a period for periodically transmitting a measurement result message,
    a receiver configured to receive the measurement result message from the user terminal, wherein
    the measurement result message includes a statistic based on a received signal intensity for each of the plurality of subchannels, and
    the measurement result message is used to select a communication mode for a user terminal group that includes the user terminal.

2. A user terminal that supports direct communication in which a data path does not go through a network, the user terminal comprising:
    a receiver configured to receive from a base station, a measurement instruction message for a measurement of a frequency region available for the direct communication, wherein the frequency region includes a plurality of subchannels, each of the plurality of subchannels including a plurality of resource blocks, and the measurement instruction message indicates a period for periodically transmitting a measurement result message,
    a controller configured to measure a received signal intensity for each of the plurality of subchannels, and
    a transmitter configured to transmit the measurement result message according to the period, wherein
    the measurement result message includes a statistic based on the received signal intensity for each of the plurality of subchannels, and
    the measurement result message is used to select a communication mode for a user terminal group that includes the user terminal.

* * * * *